United States Patent
Miura et al.

(10) Patent No.: US 7,202,902 B2
(45) Date of Patent: Apr. 10, 2007

(54) IMAGE MONITOR APPARATUS CONTROLLING CAMERA AND ILLUMINATION IN ORDER TO OPTIMIZE LUMINANCE OF PICKED-UP IMAGE

(75) Inventors: Tsuyoshi Miura, Kawasaki (JP); Ichiro Kagami, Kawasaki (JP); Noriyuki Ihara, Kawasaki (JP); Hiroshi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 219 days.

(21) Appl. No.: 09/821,439

(22) Filed: Mar. 29, 2001

(65) Prior Publication Data
US 2002/0067422 A1  Jun. 6, 2002

(30) Foreign Application Priority Data
Oct. 11, 2000  (JP)  .............................. 2000-311106

(51) Int. Cl.
H04N 5/222 (2006.01)
H04N 5/235 (2006.01)
G03B 7/00 (2006.01)

(52) U.S. Cl. ...................................... 348/370; 348/362
(58) Field of Classification Search ................ 348/370, 348/363, 367, 364, 224.1, 362
See application file for complete search history.

(56) References Cited
U.S. PATENT DOCUMENTS 5,223,935 A * 6/1993 Tsuji et al. .................. 348/364
5,497,196 A * 3/1996 Nishida ....................... 348/363
5,671,013 A * 9/1997 Nakao ......................... 348/234
6,359,651 B1 * 3/2002 Yokonuma .................. 348/370
6,441,856 B1 * 8/2002 Sugimoto ................... 348/371
6,445,884 B1 * 9/2002 Yahav ......................... 396/106
6,603,507 B1 * 8/2003 Jiang et al. .................. 348/370

FOREIGN PATENT DOCUMENTS

JP 07244718 9/1995

* cited by examiner

Primary Examiner—Vivek Srivastava
Assistant Examiner—Kelly Jerabek
(74) Attorney, Agent, or Firm—Katten Muchin Rosenman LLP

(57) ABSTRACT

In an image monitor apparatus for monitoring an image: a camera picks up an image; an emission control unit controls at least one light emitting element; an image signal acquiring unit performs analog-to-digital conversion of the image picked up by the camera so as to generate a digitized image signal, and stores the digitized image signal; a luminance examining unit examines luminance of the image represented by the digitized image signal, and determines whether or not the amount of light detected and stored in an image-pickup plane of the camera is appropriate; and a luminance control unit controls at least one of the camera and the luminance control unit so that the amount of light stored in an image-pickup plane becomes appropriate.

5 Claims, 8 Drawing Sheets

IMAGE MONITOR APPARATUS CONTROLLING CAMERA AND ILLUMINATION IN ORDER TO OPTIMIZE LUMINANCE OF PICKED-UP IMAGE

BACKGROUND OF THE INVENTION

1) Field of the Invention

The present invention relates to an image monitor apparatus which controls a camera and a lighting system.

2) Description of the Related Art

Recently, in many image monitoring systems, a plurality of images picked up by a plurality of cameras in a plurality of locations are monitored in a monitoring center in a centralized manner. In addition, needs for monitoring or surveillance of a wide area, for example, an area including roads and railroads, are growing. Further, when the monitoring is performed in the nighttime, a high-sensitivity camera and a lighting system are required in order to monitor a dark area.

In the conventional image monitoring system using a high-sensitivity camera and a lighting system, when a flashlight or car lighting is directed to the high-sensitivity camera, the entire screen may be whited out (i.e., the so-called screen white-out occurs), or blooming or smearing may occur. However, if the iris opening is narrowed, the effect of the illumination by the lighting system decreases, and the image picked up by the camera becomes dark except that an image portion produced by picking up the above external lighting is bright.

As described above, the high-sensitivity camera is more susceptible to a disturbance caused in an image picked up by the high-sensitivity camera, than the cameras having normal sensitivity, where the disturbance is caused by, for example, light incident on the camera. Therefore, in order to obtain a stable image for monitoring, the disturbance must be appropriately controlled.

SUMMARY OF THE INVENTION

An object of the present invention is to provide an image monitor apparatus which can suppress disturbances in picked-up images, and enables high-quality image monitoring.

According to the present invention, there is provided an image monitor apparatus for monitoring an image. The image monitor apparatus comprises a camera, an illumination unit, and a processing unit. The camera picks up an image. The illumination unit includes a light emission unit and an emission control unit. The light emission unit includes at least one light emitting element, and the emission control unit controls the at least one light emitting element. The processing unit includes an image signal acquiring unit, a luminance examining unit, and a luminance control unit. The image signal acquiring unit performs analog-to-digital conversion of the image picked up by the camera so as to generate a digitized image signal, and stores the digitized image signal. The luminance examining unit examines luminance of the image represented by the digitized image signal, and determines whether or not the amount of light detected by the camera and stored in an image-pickup plane of the camera is appropriate for suppressing disturbances in the image. The luminance control unit controls at least one of the camera and the illumination unit so that the amount of light becomes appropriate for suppressing disturbances in the image, when the luminance examining unit determines that the current amount of light detected by the camera and stored in the image-pickup plane is not appropriate for suppressing disturbances in the image.

The image monitor apparatus according to the present invention may also have one or any possible combination of the following additional features (i) to (iv).

(i) The luminance control unit may make feedback control of the camera so that a shutter speed of the camera is increased within such a range that a duration in which a shutter of the camera is open is not shorter than a duration of illumination by the illumination unit, and an iris opening of the camera is maximized.

(ii) In the image monitor apparatus having the feature (i), when the amount of light cannot become appropriate for suppressing disturbances in the image even when the shutter speed of the camera is increased by the feedback control to the duration of illumination by the illumination unit, the luminance control unit may increase the amount of light emitted by the illumination unit, and reduce the size of the iris opening.

(iii) The luminance control unit may control the illumination unit so that the at least one light emitting element emits only when an image of a frame which is necessary for image processing is picked up by the camera.

(iv) The luminance control unit may automatically detect blooming or smearing in the image based on the luminance of the image.

According to the present invention, a stable image in which disturbance is suppressed can be obtained for monitoring. Therefore, it is possible to perform reliable, high-quality image monitoring.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Embodiments of the present invention are explained below with reference to drawings.

(1) Construction of Image Monitor Apparatus

Figure 1:
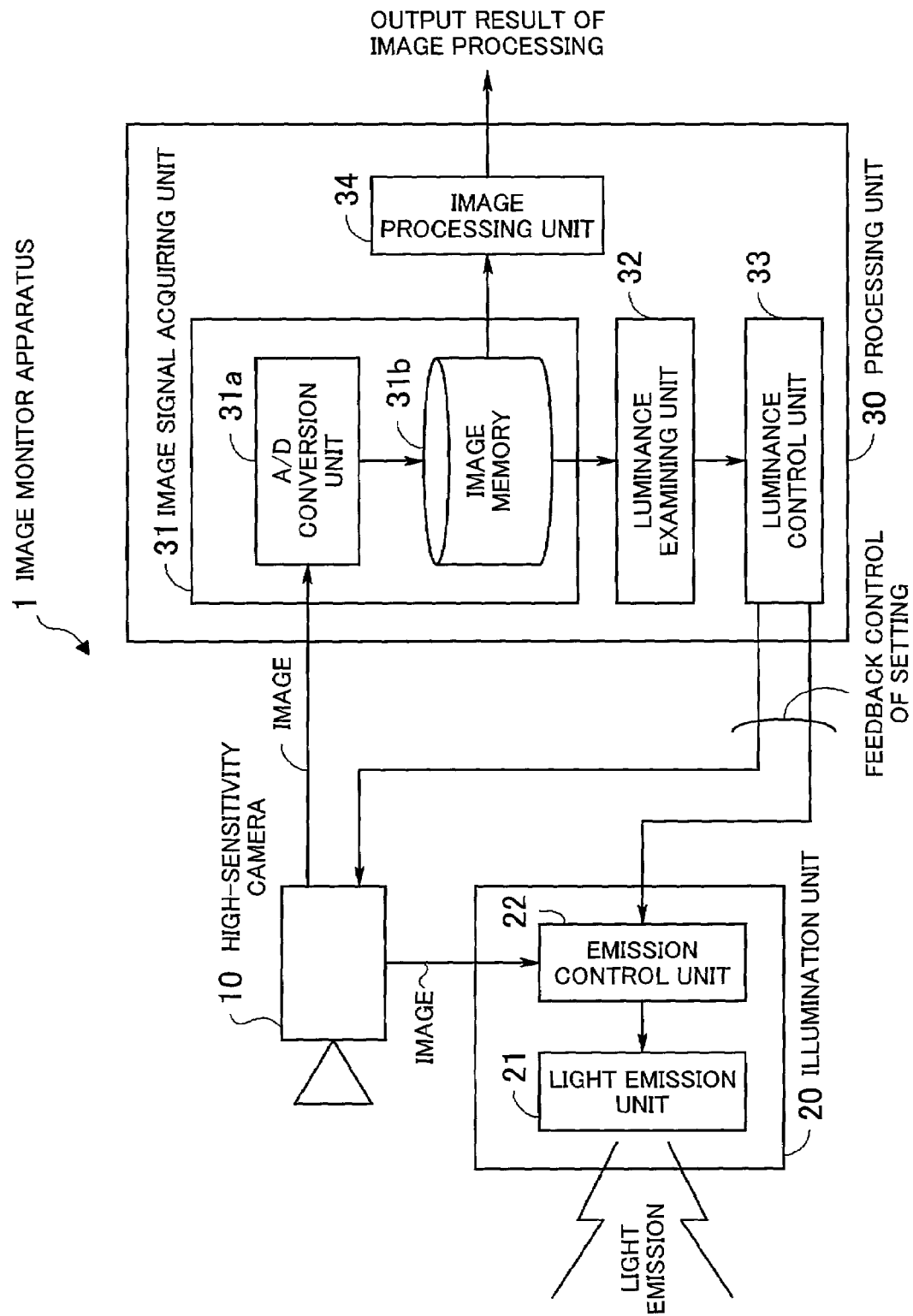
FIG. 1 is a diagram illustrating a basic construction of an image monitor apparatus according to the present invention.

FIG. 1 is a diagram illustrating a basic construction of an image monitor apparatus according to the present invention.

As illustrated in FIG. 1, the image monitor apparatus 1 according to the present invention comprises a (high-sensitivity) camera 10, an illumination unit 20, and a processing unit 30. The camera 10 picks up an image of an object, and generates an (analog) image signal representing the image. For example, the image signal is in accordance with the NTSC or PAL standard. Alternatively, the image signal can be in accordance with any other standard. The illumination unit 20 illuminates the object, for example, in the nighttime, and comprises a light emission unit 21 and an emission control unit 22. The light emission unit 21 comprises at least one light emitting element which emits light for illumination of the object. The emission control unit 22 controls the light emission by the light emission unit 21, for example, as explained later with reference to FIG. 2.

The processing unit 30 controls the camera 10 and the illumination unit 20, and processes the image signal generated by the camera 10. The processing unit 30 comprises an image signal acquiring unit 31, a luminance examining unit 32, a luminance control unit 33, and an image processing unit 34. The image signal acquiring unit 31 comprises an A/D conversion unit 31a and an image memory 31b. The A/D conversion unit 31a receives the analog image signal from the camera 10, and converts the analog image signal into a digitized image signal by performing A/D conversion for each field corresponding to 1/60 seconds. The image memory 31b stores the digitized image signal. The image processing unit 34 reads out the image signal from the image memory 31b, and processes the image signal. For example, the image processing unit 34 performs processing for person recognition. In this case, the image processing unit 34 sends information on the recognized person to a monitoring center, as well as the image signal.

The luminance examining unit 32 reads out the image signal stored in the image memory 31b, and determines whether or not the luminance of the image represented by the image signal is appropriate for suppressing disturbances in the image picked up by the camera 10, or preferably whether or not the luminance of the image represented by the image signal is optimum for suppressing disturbances in the image picked up by the camera 10. Thus, the luminance examining unit 32 can determine whether or not the amount of light detected by the camera 10 and stored in the image-pickup plane of the camera 10 is appropriate (or optimum). When the luminance examining unit 32 determines that the amount of light detected and stored in an image-pickup plane is not appropriate (or optimum) for suppressing disturbances in the image picked up by the camera 10, the luminance control unit 33 controls at least one of the camera 10 and the illumination unit 20 so that the above amount of light becomes appropriate (or optimum) for suppressing disturbances in the image picked up by the camera 10. Details of the operations of the luminance control unit 33 are explained later with reference to FIG. 3.

Figure 2:
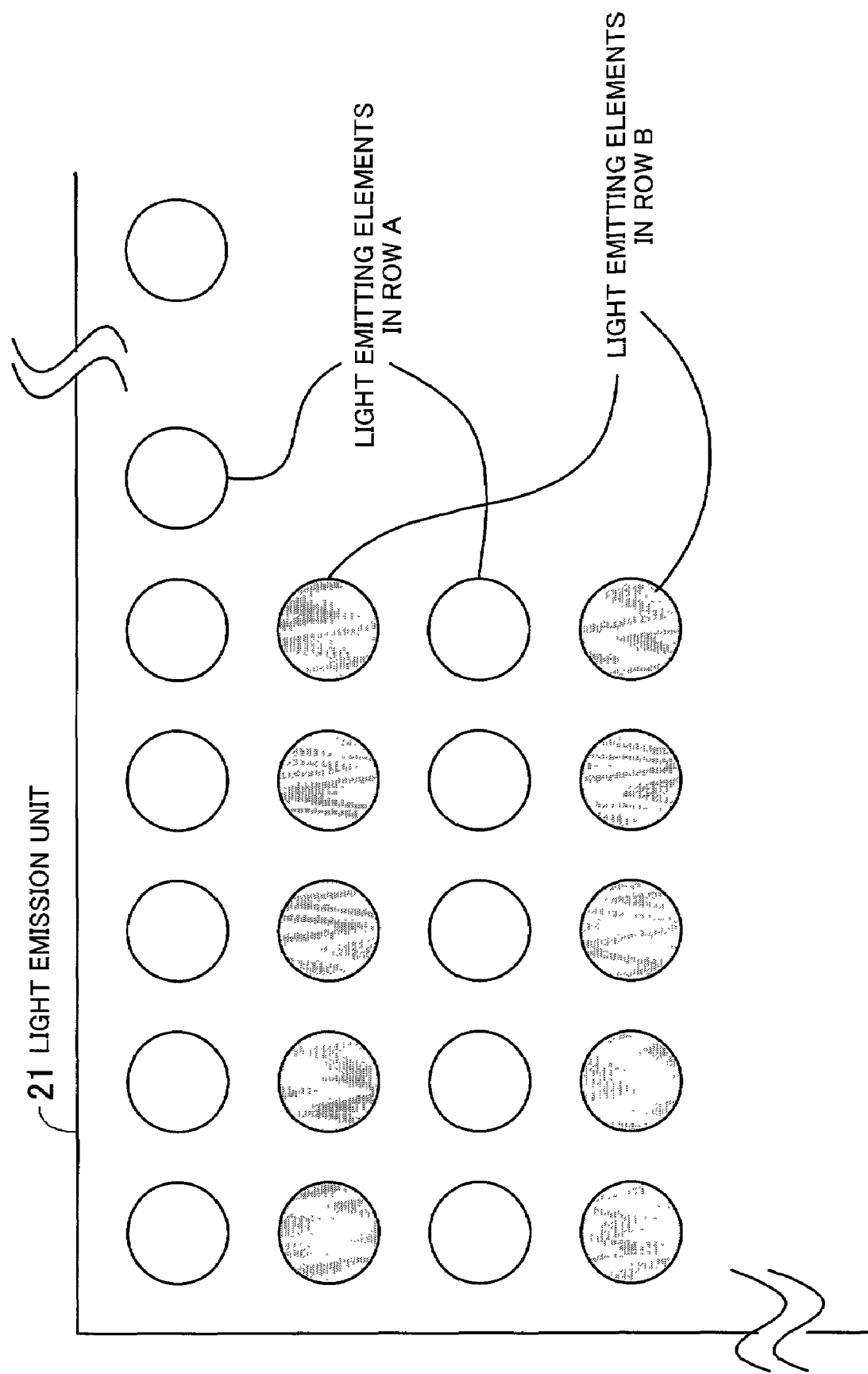
FIG. 2 is a diagram illustrating a portion of an example of the light emission unit.

FIG. 2 is a diagram illustrating a portion of an example of the light emission unit 21. The light emission unit 21 illustrated in FIG. 2 comprises a plurality of light emitting elements, which are arranged in a plurality of rows. In FIG. 2, the odd-numbered rows are denoted by "A", and the even-numbered rows are denoted by "B". The emission control unit 22 controls the light emission of the plurality of light emitting elements in the light emission unit 21. For example, light emitting elements in the row "A" and the light emitting elements in the row "B" are alternately activated under the control of the emission control unit 22. Alternatively, all of the light emitting elements in the light emission unit 21 may be activated concurrently. In addition, the emission control unit 22 controls the light emission unit 21 so that the timing of the activation (i.e., emission) of the light emitting elements in the light emission unit 21 is synchronized with the image acquisition timing of the camera 10.

(2) Overall Operation of Image Monitor Apparatus

Figure 3:
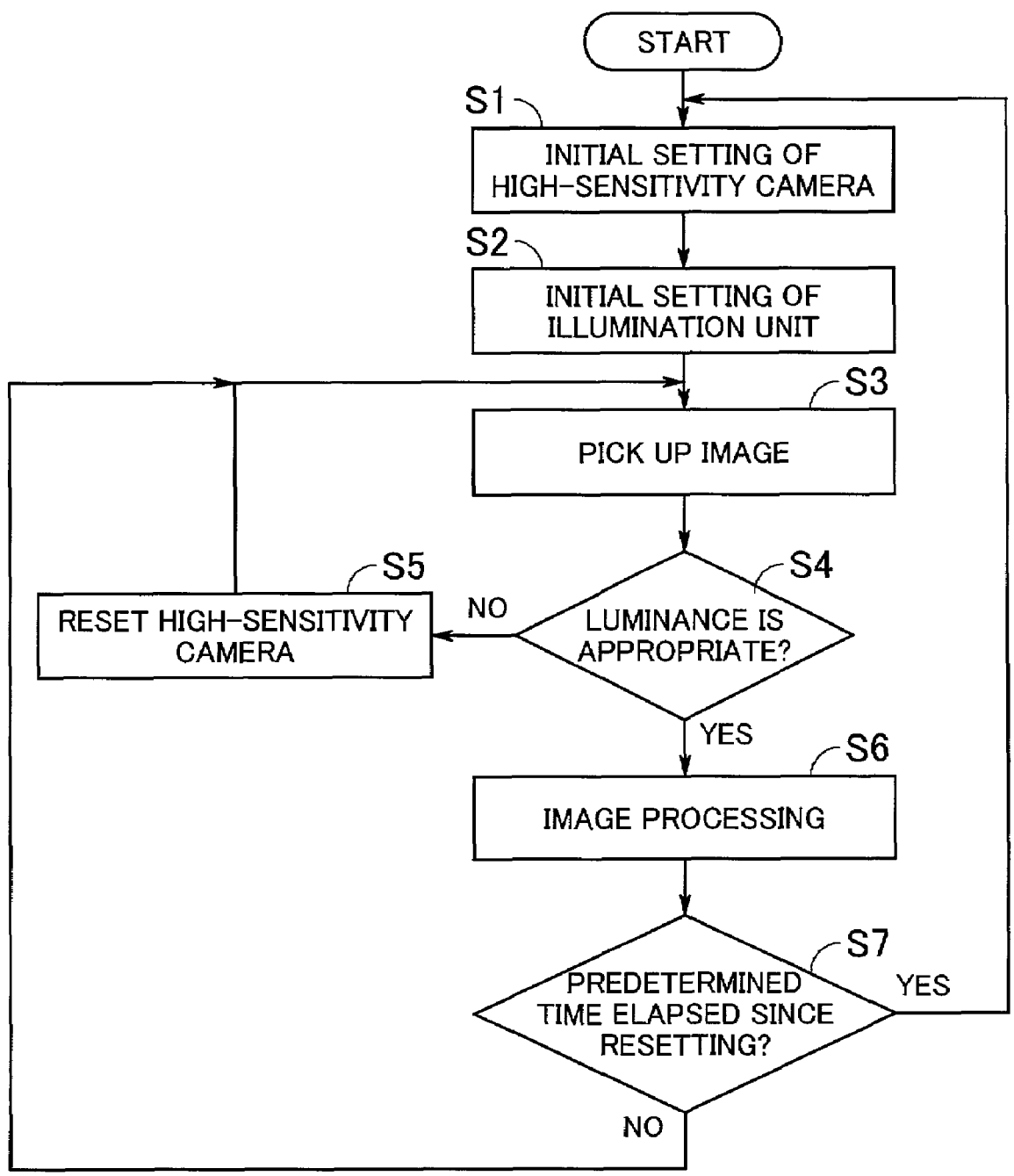
FIG. 3 is a flow diagram illustrating an overall operation performed in an image monitor apparatus as a first embodiment of the present invention.

FIG. 3 is a flow diagram illustrating an overall operation performed in the image monitor apparatus as the first embodiment of the present invention.

In step S1, the luminance control unit 33 makes an initial setting of the high-sensitivity camera 10. Specifically, the shutter speed of the high-sensitivity camera 10 is set to the slowest (longest) possible value in order to efficiently utilize external illumination (such as ambient light and moonlight) when the illumination unit 20 does not emit light. In addition, the iris of the high-sensitivity camera 10 is set to an auto iris setting so that the high-sensitivity camera 10 automatically picks up an optimum image under available illumination.

In step S2, the luminance control unit 33 makes an initial setting of the illumination unit 20. Specifically, the duration of illumination (or flash duration) is set to the shortest time which can provide a sufficient amount of light for image processing, in order to lengthen the life of each light emitting element.

In step S3, after the above initial setting, the high-sensitivity camera 10 picks up an image. The image signal acquiring unit 31 makes the A/D conversion of the picked-up image, and stores the digitized image signal in the image memory 31b.

In step S4, the luminance examining unit 32 determines whether or not the luminance of the image represented by the digitized image signal stored in the image memory 31b is appropriate for suppressing disturbances in the image. For example, as mentioned before, when a flashlight or car lighting is directed to the high-sensitivity camera 10, an excessive amount of light is stored in the image-pickup plane of the high-sensitivity camera 10 due to the strong light, and the entire screen may be whited out, or blooming or smearing may occur.

For example, in the case of NTSC signals, when the luminance value at coordinates (i,j) is expressed by y(i,j), and the sum total of luminance values of all pixels in an image is expressed by Y, the sum total Y of luminance values in each field of an NTSC signal is expressed as $$Y = \sum_{i=1}^{640} \sum_{j=1}^{240} y(i, j) \quad (1)$$

When the sum total Y of luminance values in a field is greater than a threshold value which is preset, it is considered that the entire screen is whited out (i.e., all pixels have very high luminance values). Therefore, in this case, the luminance examining unit 32 determines that the influence of external lighting is great, and the operation goes to step S5. When the sum total Y of luminance values in a field is smaller than the threshold value, the luminance examining unit 32 determines that the luminance of the image is appropriate for the image processing, and the operation goes to step S6.

In step S5, the luminance control unit 33 resets the high-sensitivity camera 10 based on the determination made by the luminance examining unit 32. First, the size of the iris opening is maximized so that the illumination by the illumination unit 20 can be most efficiently utilized. Next, in order to reduce the influence of the external lighting, the shutter speed is increased, i.e., the duration in which the high-sensitivity camera 10 detects light and stores the amount of detected light for each pixel in each field is shortened. Thus, it becomes possible to suppress contribution of the external lighting to the amount of light detected by the high-sensitivity camera 10 and stored in the image-pickup plane, and maximize the utilization of the illumination by the illumination unit 20.

When the resetting operation of the high-sensitivity camera 10 is completed, the operation goes back to step S3, and the high-sensitivity camera 10 performs an operation of picking up the next image. Then, in step S4, the luminance examining unit 32 determines again whether or not the luminance of the next image is appropriate for image processing. When the luminance examining unit 32 determines that the influence of the external lighting is still great, the luminance control unit 33 further increases the shutter speed while maintaining the maximized iris opening. However, if the shutter speed falls below the duration of the illumination by the illumination unit 20, the illumination by the illumination unit 20 is not effectively utilized, and the image may become dark except that an image portion produced by picking up the external lighting is bright. Therefore, when the shutter speed reaches the duration of the illumination by the illumination unit 20, the shutter speed is maintained at the duration of the illumination by the illumination unit 20. The above feedback operations in the loop of steps S3, S4, and S5 are repeated until the luminance examining unit 32 determines that the influence of the external lighting is not great, i.e., the luminance of the image is appropriate for image processing.

In step S6, the image processing unit 34 performs image processing of the image signal of which the luminance is determined to be appropriate. Since the setting of the high-sensitivity camera 10 is optimized in the above feedback control as preprocessing, it is possible to obtain an appropriate image signal, and perform appropriate image processing.

In step S7, the luminance control unit 33 determines whether or not a predetermined time has elapsed since the time of the resetting of the high-sensitivity camera 10. When the predetermined time has not elapsed, or when the resetting has not been made, the operation goes back to step S3. When the luminance control unit 33 determines that the predetermined time has elapsed, it is assumed that the disturbance (such as the car lighting directed to the high-sensitivity camera 10) is eliminated. Therefore, the operation goes back to step S1, and the initial setting of the high-sensitivity camera 10 is made again.

(3) Timing of Luminance Control

Figure 4:
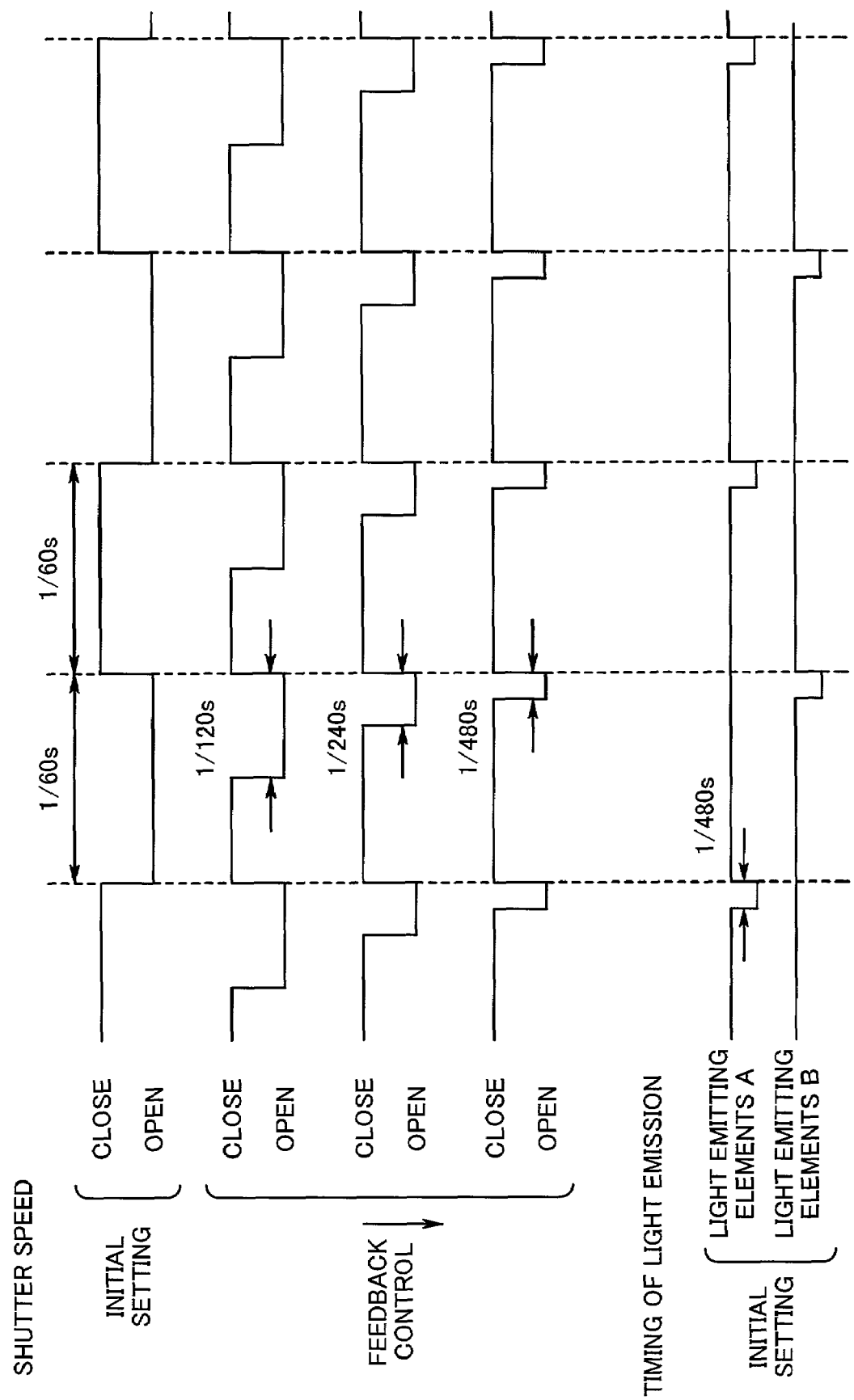
FIG. 4 is a timing diagram illustrating examples of operations performed in the first embodiment of the present invention.

FIG. 4 is a timing diagram illustrating examples of operations performed in the first embodiment of the present invention. In this example, it is assumed that only the odd-numbered fields F1 or only the even-numbered fields F2 are used for image processing. In the initial setting, an image pickup period is set to $1/60$ seconds, the duration of illumination is set to $1/480$ seconds, the intensity of the illumination is set to a value which is realized by alternately activating the light emitting elements in the rows A and B (illustrated in FIG. 2), the shutter speed is $1/60$ seconds, and the iris is set to the auto iris setting.

When the luminance examining unit 32 determines that the influence of the external lighting is great, the size of the iris opening is reset to $F_{MIN}$, which indicates that the size of the iris opening is maximized, and the shutter speed is increased (shortened) to $1/120$ seconds. The other settings are the same as the initial settings.

Thereafter, the determination whether or not the influence of the external lighting is great, and the increase (shortening) of the shutter speed are repeated until the shutter speed reaches the duration of the illumination, $1/480$ seconds. In each operation of increasing the shutter speed, the shutter speed is doubled, i.e., the duration in which the shutter is open is reduced by half. However, if the shutter speed falls below the duration of the illumination by the illumination unit 20, the illumination by the illumination unit 20 is not effectively utilized, and the image may become dark except that an image portion produced by picking up the external lighting is bright. Therefore, when the shutter speed reaches the duration of the illumination, $1/480$ seconds, the above feedback operations are completed, and an image picked up by the high-sensitivity camera 10 with the shutter speed of $1/480$ seconds is used in the image processing.

As explained above, in the first embodiment of the present invention, contribution of the external lighting to the amount of light stored in the image-pickup plane can be suppressed by feedback control of the shutter speed. In addition, it is possible to maximize the utilization of the illumination by the illumination unit 20 for image monitoring.

(4) Second Embodiment

The feedback control in the second embodiment of the present invention is explained below.

In the second embodiment, when the luminance examining unit 32 determines that the influence of the external lighting is still great even after the shutter speed is increased (shortened) to the duration of the illumination by the illumination unit 20 by the feedback control made in the first embodiment, the image monitor apparatus further makes feedback control of the intensity of the illumination by the illumination unit 20 and the size of the iris opening. That is, when the luminance examining unit 32 determines that the influence of the external lighting is great, the intensity of the illumination by the illumination unit 20 is increased, and the size of the iris opening is adjusted corresponding to the increase in the intensity of the illumination.

Specifically, when the luminance examining unit 32 determines that the influence of the external lighting is great, the luminance control unit 33 sends to the emission control unit 22 an instruction to increase the number of light emitting elements which are concurrently activated. In accordance with the instruction, the emission control unit 22 controls the light emission unit 21 so as to increase the number of light emitting elements. In addition, the luminance control unit 33 sends to the high-sensitivity camera 10 an instruction to reduce the size of the iris opening corresponding to the increase in the intensity of the illumination, so that contribution of the illumination by the illumination unit 20 to the light level at the high-sensitivity camera 10 is maintained equivalent to that in the first embodiment. In accordance with the instruction, the high-sensitivity camera 10 reduces the size of the iris opening. The above feedback control of the intensity of the illumination by the illumination unit 20 and the size of the iris opening is repeated until the luminance examining unit 32 determines that the influence of the external lighting is not great. When the influence of the external lighting is eliminated by the feedback control, the image monitoring is performed. Thereafter, when a predetermined time elapses since the above feedback control is completed, it is assumed that the disturbance such as the influence of the external lighting is eliminated, and the initial setting of the high-sensitivity camera 10 and the illumination unit 20 is made again.

When the disturbance such as the influence of the external lighting is eliminated, the above increase in the intensity of the illumination is unnecessary. Therefore, it is possible to efficiently use the light emitting elements by initializing the high-sensitivity camera 10 and the illumination unit 20 when a predetermined time elapses since the above feedback control is completed. Thus, the life of each light emitting element can be lengthened.

Figure 5:
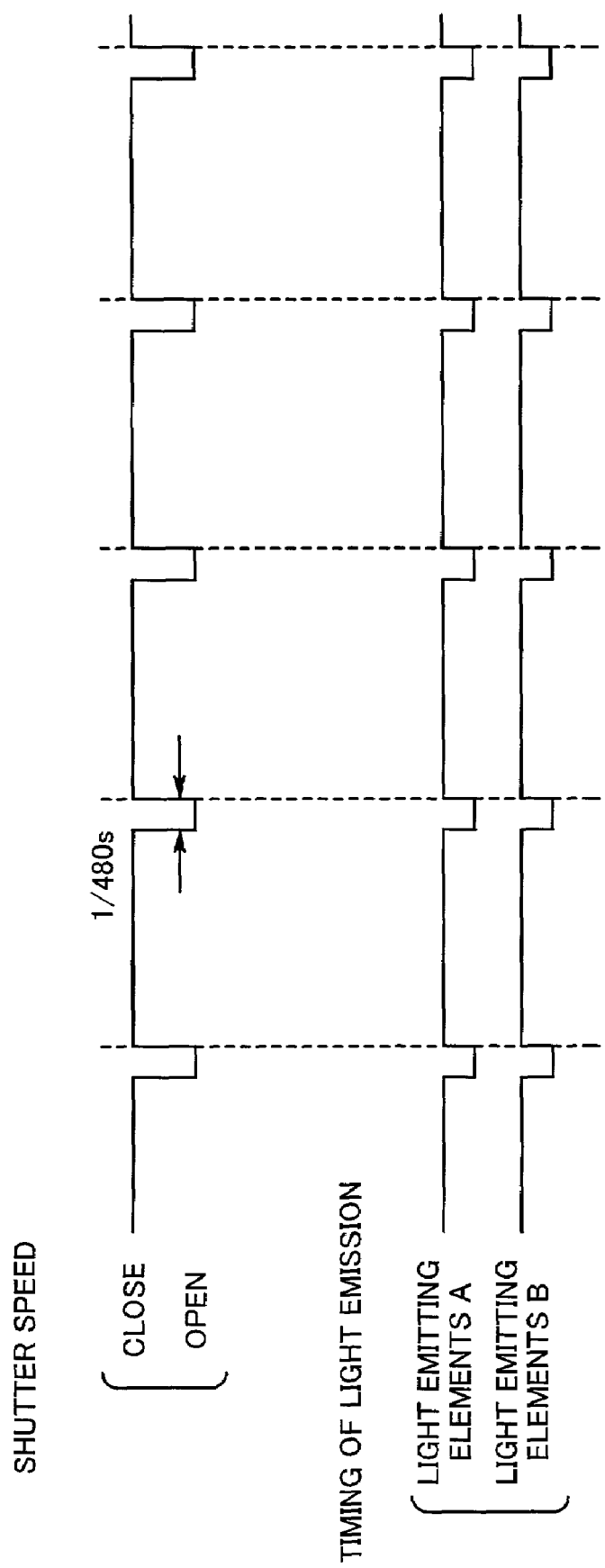
FIG. 5 is a timing diagram illustrating examples of operations performed in a second embodiment of the present invention.

FIG. 5 is a timing diagram illustrating examples of operations performed in the second embodiment of the present invention.

When the luminance examining unit 32 determines that the influence of the external lighting is still great after the feedback control in the first embodiment, the luminance control unit 33 controls the illumination unit 20 so as to concurrently activate the light emitting elements in both of the rows A and B, and resets the high-sensitivity camera 10 so as to reduce the size of the iris opening by half to $F_{MIN}/2$. In the example of FIG. 5, the shutter speed is set to 1/480 seconds as a result of the feedback control in the first embodiment.

As explained above, in the second embodiment, the intensity of the illumination by the illumination unit 20 and the iris opening in the high-sensitivity camera 10 are controlled, after the control of the shutter speed in the first embodiment, so as to suppress the disturbance in the image picked up by the high-sensitivity camera 10.

(5) Third Embodiment

The feedback control in the third embodiment of the present invention is explained below.

In image monitoring, sometimes, it is not necessary to perform image processing of an image of every frame. Therefore, for example, if image processing is performed on an image of every two or three frames, illumination by the illumination unit 20 is unnecessary for the skipped frames. Therefore, in the third embodiment, the illumination unit 20 is controlled so as to activate the light emitting elements only when an image of a frame which is necessary for image processing is picked up.

Figure 6:
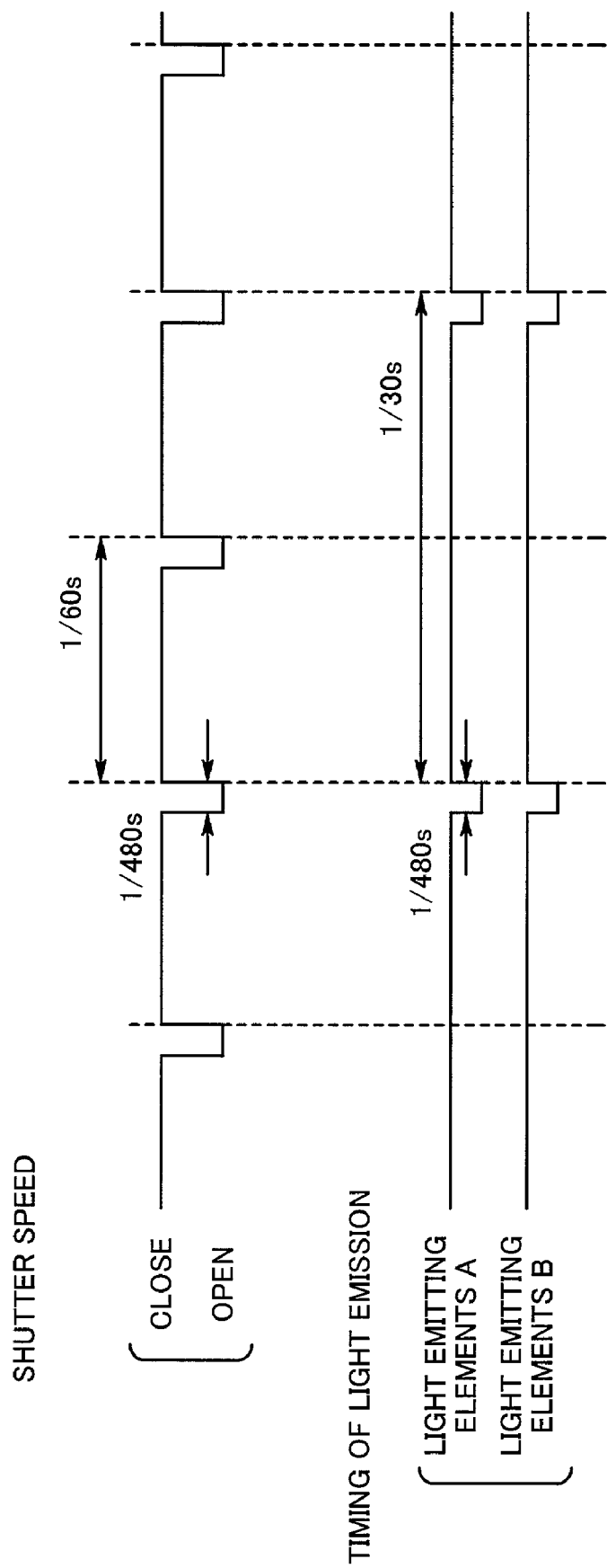
FIG. 6 is a timing diagram illustrating examples of operations performed in a third embodiment of the present invention.

FIG. 6 is a timing diagram illustrating examples of operations performed in the third embodiment of the present invention. In the example of FIG. 6, the image pickup period is 1/30 seconds, and the illumination timing is set so that the illumination by the illumination unit 20 synchronizes with the image pickup timing. In addition, the size of the iris opening is reduced by half to $F_{MIN}/2$, and the light emitting elements in both of the rows A and B are concurrently activated.

(6) Automatic Recognition of Blooming

Automatic recognition (detection) of blooming is explained below.

Sometimes, external lighting causes blooming as well as the screen white-out. The blooming is halation or defocus which occurs around bright areas produced in an image by picking up a very bright object such as external lighting. The luminance examining unit 32 can automatically detect the blooming, and the luminance control unit 33 makes feedback control until the blooming disappears. The characteristic of the blooming is that white (bright) pixels are distributed around a point corresponding to a light source, and form a bright round area, and the brightness of the pixels around the bright round area gradually decreases so that the area around the bright round area is blurred. Therefore, in order to detect the blooming, the bright area is first extracted, and it is then determined whether or not an area around the bright area is blurred. However, in the above operation of extracting the bright area, small bright areas which are considered not to affect the image processing are ignored. In addition, bright areas which are not surrounded by blurred areas are each recognized to be a bright object instead of blooming.

Figure 7:
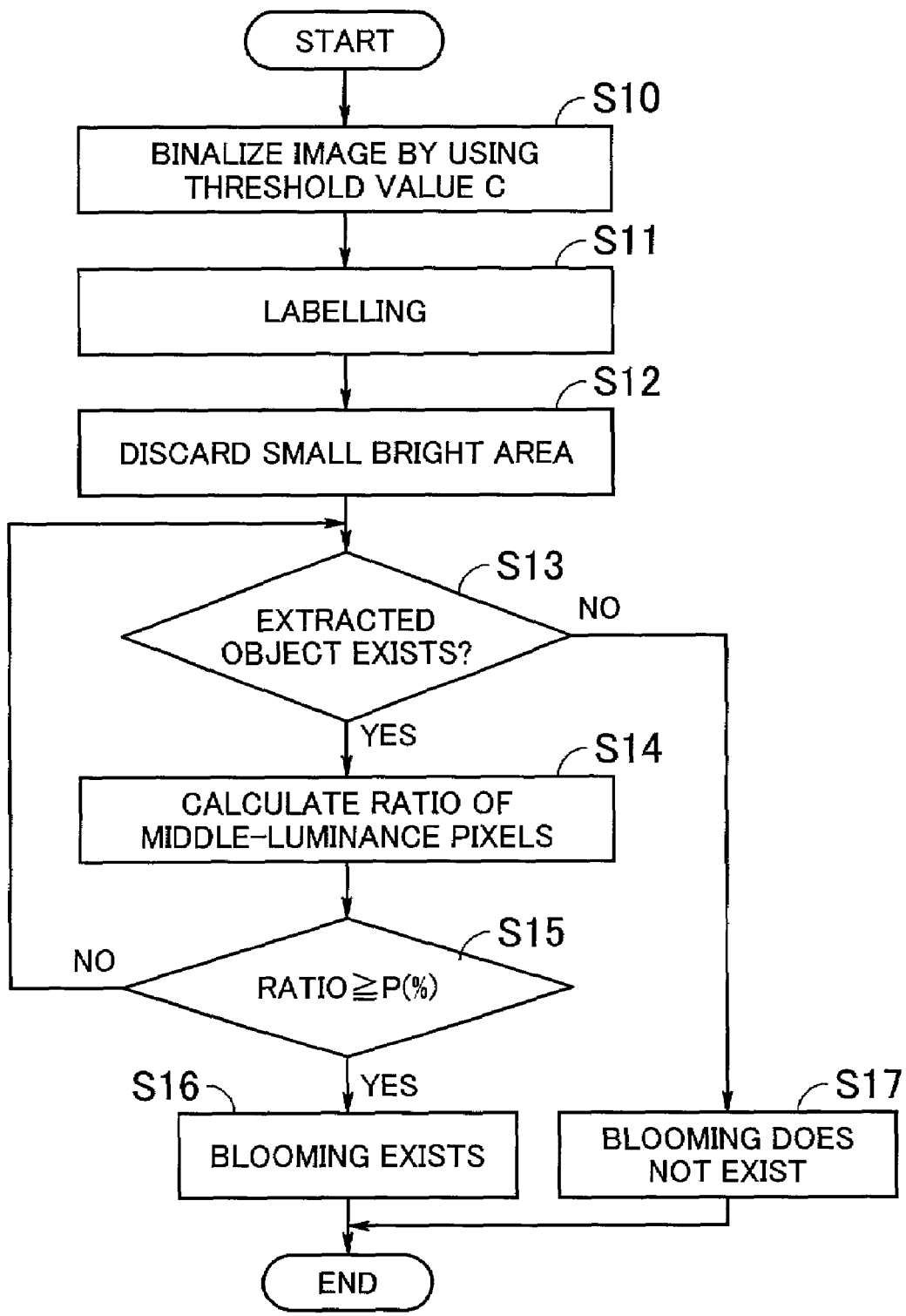
FIG. 7 is a flow diagram illustrating a sequence of operations for detecting blooming.

FIG. 7 is a flow diagram illustrating a sequence of operations for detecting blooming.

A threshold value C used for determining the above bright area and another threshold value D used for determining the above blurred area are set in advance in the image monitor apparatus 1.

In step S10, the luminance examining unit 32 performs processing for binalizing all pixels of an image picked up by the high-sensitivity camera 10 by using the threshold value C. That is, pixel values equal to or greater than the threshold value C are converted to one, and pixel values smaller than the threshold value C are converted to zero.

In step S11, the luminance examining unit 32 performs processing for labelling the binalized image, and extracts as at least one object at least one aggregation of pixels having the value "one", where the labelling is an operation of assigning a label (number) to each pixel of a binalized image in order to extract at least one object included in the image.

In step S12, the luminance examining unit 32 discards at least one object which has an area smaller than a predetermined value S, from among the at least one object extracted in step S11.

In step S13, the luminance examining unit 32 determines whether or not at least one extracted object exists after the discard in step S12. When yes is determined, the operation goes to step S14. When no is determined, the operation goes to step S17.

In step S14, the luminance examining unit 32 counts the number of pixels having a value equal to or greater than the threshold value D and smaller than the threshold value C in an area surrounding each of the at least one extracted object, where the surrounding area has a loop shape having a width of N pixels in each of the vertical and horizontal directions. Then, the luminance examining unit 32 calculates the ratio between the counted number and the total number of pixels in the surrounding area.

In step S15, the luminance examining unit 32 compares the ratio calculated in step S14 with a predetermined value P(%). When the ratio calculated in step S14 is equal to or greater than the predetermined value P, the operation goes to step S16. When the ratio calculated in step S14 is smaller than the predetermined value P, the operation goes back to step S13.

In step S16, the luminance examining unit 32 recognizes the extracted object as blooming.

In step S17, the luminance examining unit 32 recognizes that no blooming exists in the image.

Figure 8:
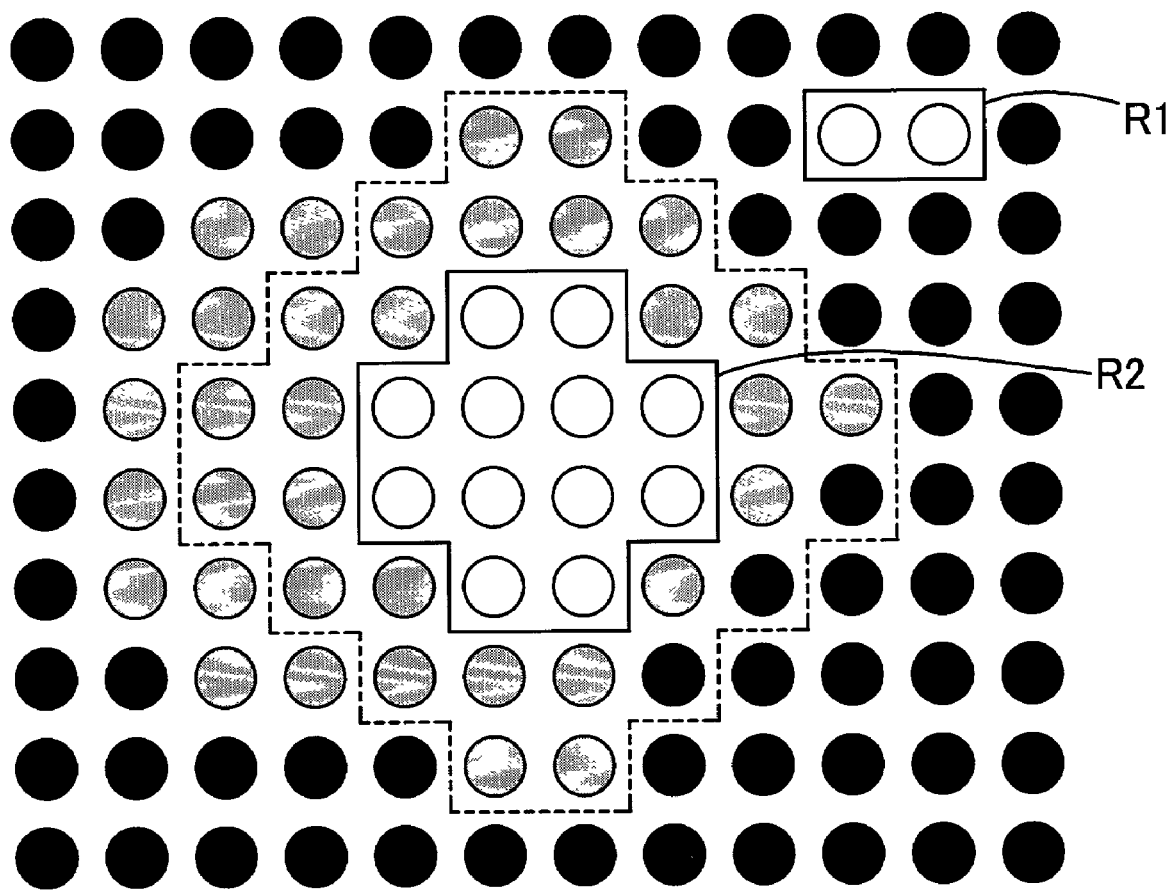
FIG. 8 is a diagram illustrating an example of a portion of an image which includes blooming.

FIG. 8 is a diagram illustrating an example of a portion of an image which includes blooming. In the example of FIG. 8, high-luminance pixels (i.e., pixels having a value equal to or greater than the threshold value C) are indicated with blank circles, middle-luminance pixels (i.e., pixels having a value equal to or greater than the threshold value D and smaller than the threshold value C) are indicated with grey circles, and the other pixels including low-luminance pixels (i.e., pixels having a value smaller than the threshold value D) are indicated with black circles.

First, each aggregation of high-luminance pixels, which are encircled by solid lines in FIG. 8, is examined. When the above-mentioned predetermined area S is ten (pixels), the aggregation R1, which is indicated in the upper right portion of FIG. 8, is regarded as noise, and discarded. Next, the area surrounding the aggregation R2 and having a loop shape with a width of two pixels in each of the vertical and horizontal directions, which is encircled by dashed lines in FIG. 8, is examined. In this example, the number of the pixels in the surrounding area is twenty-eight, and twenty-five pixels among the twenty-eight pixels are middle-luminance pixels. Therefore, the ratio between the number of middle-luminance pixels and the total number of pixels in the surrounding area is obtained as (25/28)×100=89%. Then, the obtained ratio is compared with the predetermined value P(%) in order to determine whether or not the aggregation R2 constitutes blooming. For example, when the predetermined value P is 80(%), the luminance examining unit 32 determines that the aggregation R2 constitutes blooming.

(7) Automatic Recognition of Smear

Automatic recognition (detection) of a smear is explained below.

Sometimes, external lighting also causes a smear in an image picked up by the high-sensitivity camera 10. The smear is a vertical streak which appears above and below bright areas produced in an image by picking up a very bright object such as the external lighting. The luminance examining unit 32 can automatically detect the smear, and the luminance control unit 33 makes feedback control until the smear disappears. The characteristic of the smear is that white (bright) pixels are distributed above and below a point corresponding to a light source, and form a bright vertical streak. Therefore, in order to detect a smear, the sum total of luminance values of pixels on each vertical line is calculated, and it is determined whether or not a smear exists on the line, based on the sum total of the luminance values.

For example, in the case of NTSC signals, when the luminance value at coordinates (i,j) is expressed by y(i,j), and the sum total of luminance values of all pixels on each vertical line in an image is expressed by Y', the sum total Y' is expressed as $$Y'(i) = \sum_{j=1}^{240} y(i, j) \quad (2)$$

When the sum total Y' of luminance values on each vertical line is greater than a predetermined threshold value A, it is considered that a bright line exists on the vertical line, i.e., it is determined that a smear exists on the vertical line. When the sum total Y' is not greater than the predetermined threshold value A, it is determined that a smear does not exist on the vertical line. The above determination is made on all of the vertical lines in an image. In the case of the NTSC signals, the number of the vertical lines is 640. When all of the vertical lines in the image are determined not to include a smear, it is determined that no smear exists in the image.

(8) Advantages and Other Matters (i) As explained above, the image monitor apparatus 1 according to the present invention determines whether or not the amount of light detected by the high-sensitivity camera 10 and stored in the image-pickup plane of the high-sensitivity camera 10 is appropriate (or optimum) for suppressing disturbances in the image, based on the luminance values of the image signal. When it is determined that the amount of light is not appropriate, feedback control of at least one of the high-sensitivity camera 10 and the illumination unit 20 is made. Therefore, it is possible to suppress the influence of light from the external light source in the high-sensitivity camera 10, and obtain a stable image by using the high-sensitivity camera 10. In addition, since the duration and the intensity of illumination by the illumination unit 20 are controlled so that the light emitting elements are efficiently used, it is possible to lengthen the life of each light emitting element in the illumination unit 20, and perform efficient image monitoring.

(ii) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(iii) All of the contents of the Japanese patent application, No.2000-311106 are incorporated into this specification by reference.

What is claimed is:

1. An image monitor apparatus for monitoring an image, comprising:
   a camera which picks up an image;
   an illumination unit which includes,
      a light emission unit having a plurality of light emitting elements, which are arranged in a plurality of rows, and
      an emission control unit which controls the light emitting elements; and
   a processing unit which includes,
      an image signal acquiring unit which performs analog-to-digital conversion of said image picked up by said camera so as to generate a digitized image signal, and stores the digitized image signal,
      a luminance examining unit which counts a sum total of luminance value of all pixels in a field of the image represented by said digitized image signal and examines whether or not said sum total of luminance value is greater than a predetermined threshold value, and determines whether or not an amount of light detected by said camera and stored in an image-pickup plane of the camera is appropriate for suppressing disturbances in said image, and
      a luminance control unit which controls at least one of said camera and said illumination unit so that said amount of light becomes appropriate for suppressing disturbances in said image, when said luminance examining unit determines that the amount of light detected by said camera and stored in the image-pickup plane is not appropriate for suppressing disturbances in said image, and when a predetermined time elapses since said amount of light becomes appropriate for suppressing disturbances in said image making an initial setting of a shutter speed of said camera to the slowest possible value in order to utilize external illumination other than illumination of said illumination unit and the initial setting of a duration of illumination of said illumination unit is set to the shortest time which can provide sufficient amount of light for image processing;
   wherein the light emitting elements in odd numbered rows and the light emitting elements in even-numbered rows are alternatively activated under the control of the luminance control unit, in the initial setting.

2. An image monitor apparatus according to claim 1, wherein said luminance control unit makes feedback control of said camera so that a shutter speed of said camera is increased within such a range that a duration in which a shutter of the camera is open is not shorter than a duration of illumination by the illumination unit, and an iris opening of said camera is maximized.

3. An image monitor apparatus according to claim 1, wherein when said amount of light cannot become appropriate for suppressing disturbances in the image even when said shutter speed of said camera is increased by said feedback control to said duration of illumination, said luminance control unit increases an amount of light emitted by said illumination unit, and reduces the size of the iris opening.

4. An image monitor apparatus according to claim 1, wherein said luminance control unit controls said illumination unit so that the at least one light emitting element emits light only when an image of a frame which is necessary for image processing is picked up by the camera.

5. An image monitor apparatus according to claim 1, wherein said luminance control unit automatically detects blooming or smearing in said image based on said luminance of the image.

* * * * *